United States Patent

[11] 3,548,897

| [72] | Inventor | Anders Lennart Ekrud |
| | | Sandviken, Sweden |
| [21] | Appl. No. | 804,754 |
| [22] | Filed | Mar. 6, 1969 |
| [45] | Patented | Dec. 22, 1970 |
| [73] | Assignee | Sandvikens Jernverks Aktiebolag |
| | | Sandviken, Sweden |
| [32] | Priority | Apr. 2, 1968 |
| [33] | | Sweden |
| [31] | | No. 4344/68 |

[54] SAW CHAIN
11 Claims, 4 Drawing Figs.

| [52] | U.S. Cl. | 143/135 |
| [51] | Int. Cl. | B27b 33/14 |
| [50] | Field of Search | 143/135, 32 |

[56] References Cited
UNITED STATES PATENTS

| 2,534,591 | 12/1950 | Geurian | 143/135 |
| 2,924,110 | 2/1960 | Gudmundsen | 143/135X |
| 3,469,610 | 9/1969 | Silvon | 143/135 |

Primary Examiner—Donald R. Schran
ATTORNEY—Curtis, Morris and Safford

ABSTRACT: A saw chain is disclosed which has side links and center links. Alternate side links have cutters on opposite sides of the chain. Each of the cutter links has a forwardly directed deflector or projection which gives the chain a safety characteristic, and the chain is free of the objectionable characteristics of other types of safety saw chains. The deflectors or projections also aid in maintaining smooth operation, and they prevent unbalanced and excessive wear on the cutter links.

PATENTED DEC 22 1970 3,548,897

INVENTOR.
Anders Lennart Ekrud
BY
Curtis, Morris & Safford
ATTORNEYS

SAW CHAIN

The present invention relates to improved saw chains, and to chain saw constructions into which the improved saw chains are incorporated. An object of this invention is to provide improved chain saw constructions. A further object is to provide improved saw chains which may be used with freedom from certain of the difficulties and dangers which have been present with some prior constructions.

With most of the prior commercial saw chains difficulties have been encountered because of the tendency for the depth gauges on the cutter links to engage twigs or limbs in a manner to produce jerks and impacts. Such actions may come unexpectedly and may result in severe accidents. Similarly, when the chain saw is being moved while it is still operating or when the nose of the bar is being projected to produce a boring and cutting action there may be sudden impacts by the depth gauges against portions of the workpiece. Special saw chains have been used to avoid this difficulty and those chains have been referred to as safety chains and as brush cutting chains. However, the prior chains of this type have not proven completely satisfactory. They do not completely avoid the difficulties and they tend to introduce new problems, including reduced cutting speeds and impaired operation. It is an object of the present invention to provide a completely satisfactory safety chain construction which avoids the dangers and difficulties of the standard types of chains and which does not create new problems. It is a further object to provide an improved chain saw having a guide bar and saw chain, illustratively of the general type shown in my U.S. Pat. No. 3,124,177. These and other objects will be in part obvious and in part pointed out below.

Referring to the drawings which illustrate one embodiment of the invention:

Figure 1:
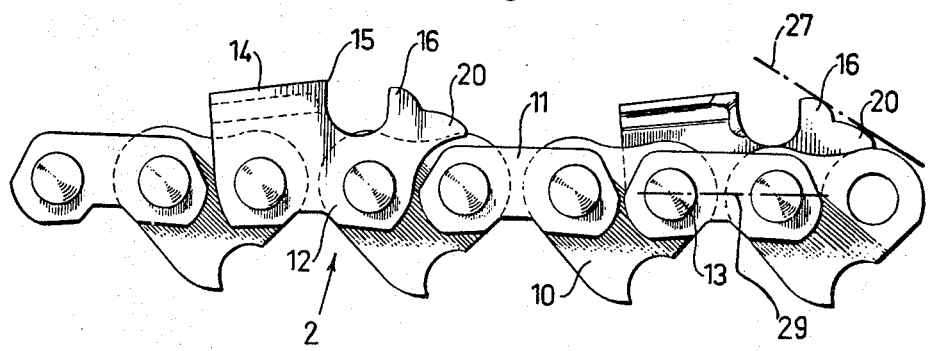
FIG. 1 is a side view of a saw chain.
Figure 2:
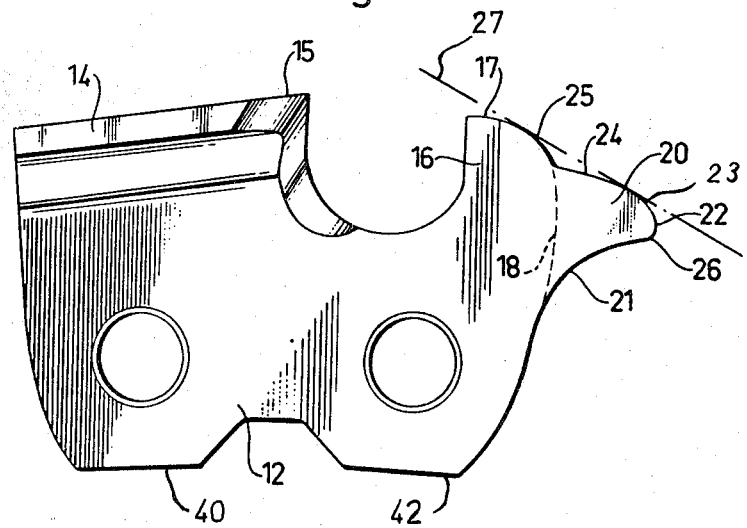
FIG. 2 is an enlarged side view of a cutter link of the saw chain of FIG. 1.
Figure 3:
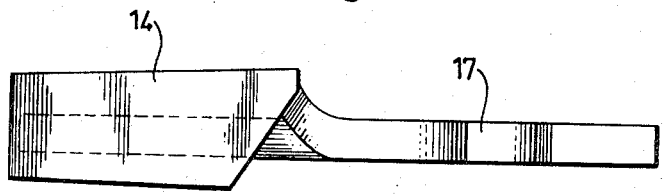
FIG. 3 is a top view of the cutter link of FIG. 2.
Figure 4:
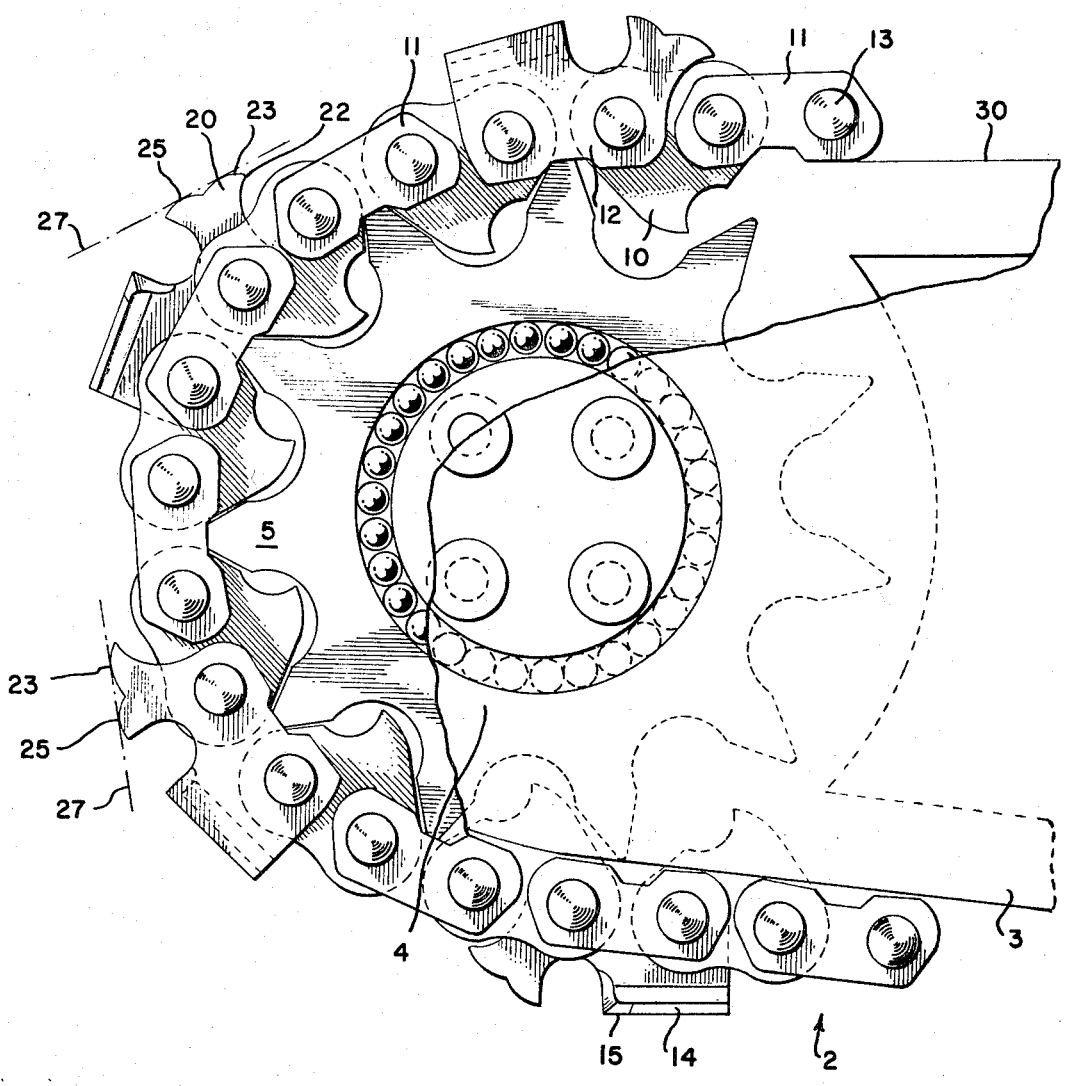
FIG. 4 shows the saw chain of FIGS. 1 to 3 installed for use.

Referring to FIG. 1 of the drawings, a saw chain 2 has center drive links 10 which are interconnected with side links 11 and 12 by pivot pins 13. In FIG. 4, saw chain 2 is mounted upon a guide bar 3 having a nose 4 with a sprocket 5 upon which the chain rests. Side links 12 are cutter links and are identical except that the links on the near side in FIG. 1 have cutter portions 14 extending toward the far side of the chain and the links on the far side have cutter portions extending toward the near side of the chain. Each of the cutter portions 14 has a cutting edge 15 and each cutter link has a depth gauge 16 which is in leading relation to its cutting edge. Each of the depth gauges has a contact surface 17 (see also FIG. 2) at its extreme end which rests upon the bottom of the kerf for the purposes of guiding the cutting edge to the level at which it will produce the desired depth of cutting. That depth of cutting is represented in FIGS. 1 and 2 as being the vertical distance between surface 17 and the cutting edge when the link is moving along the side of the guide bar.

Integral with the depth gauge 16 and projecting forwardly with respect to the path of movement of the cutter link is a deflector 20. Deflector 20 has a concave edge 21 which has its center of curvature substantially coincident with the axis of the adjacent pivot pin of the next leading side link 11. Edge 21 terminates (FIG. 2) at point 26 which is substantially in alignment with the adjacent top edge of the center drive link 10. Directly above point 26 the deflector has a forward end surface 22 and above that is a convex edge 23 which extends to a straight edge 24, which terminates at edge 25 of depth gauge 16. Surface 22 is approximately in transverse alignment with the adjacent pivot axis.

As represented at the right in FIG. 1, the line 27 which is tangent to edges 23 and 25 is at an acute angle of the order of 30° to the general plane 29 of the axes of pivot pins 13 of the links, and that plane extends in the direction of movement of the cutter links along the guide bar. Hence, when a cutter link (see FIG. 4) is moving along the side edge 30 of a guide bar, deflector 20 projects forwardly of the depth gauge and provides a deflecting structure or means which is at a trailing angle of the order of 30° with respect to the line of movement. When a twig or other item engages the saw chain between the trailing end of one cutter link and the next at the side edge of the guide bar, the movement of the chain causes the item to be engaged by deflector 20 first at the forward end surface 22 and thence by edges 23 and 24. The item is thereby deflected (upwardly in FIG. 1) with the contact being generally along line 27, and is then further deflected by edge 25. That deflecting movement imparts a transverse movement to the item tending to project it away from the chain out of the path of the cutting edge 13. Furthermore, the contact between the item and depth gauge 16 is of the nature of a glancing blow rather than a direct impact, as would occur if deflector 20 were not present and the cutter link had the standard forward edge as represented in FIG. 1 by the broken line 18.

Referring now to FIG. 4, at nose 4 of the guide bar the deflector 20 of each cutter link also provides a deflector action which prevents objectionable impacts and jerking of the chain saw. The plane 29 of the two pivot axes of each cutter link is then at an angle of the order of 30° with respect to the plane of the two pivot axes of the next leading link 11. As pointed out above, that is the angle between line 27 and plane 29, so that the line 27 of the cutter link is substantially parallel to the plane of the two pivot axes of the next leading side link. The forward end surface 22 of deflector 20 is also near the adjacent edges of the next center link and the next leading side link so that there is no exposed slot of sufficient size to permit the snagging or trapping of any item of substantial size. Hence, the cutting edge of each cutter link is exposed, but the edges of side links 11, center links 10, deflectors 20 and depth gauges 16 cooperate with the cutter portions 14 to provide a circumferential deflecting barrier around the nose of the guide bar. From the standpoint of providing a deflecting action as discussed above and from the standpoint of slots or spaces in which items can be trapped or snagged there is very little change in the relationship between the links as they move from one edge of the guide bar around the nose and to the other side edge. Small fibers or chip slivers which may be trapped between the adjacent link edges are thrown out or severed without disturbing the smooth movement of the chain.

It is thus seen that deflectors 20 cooperate with the other portions of the chain to prevent objectionable impacting and jerking actions. In addition to those improved results it has been noted that deflectors 20 produce smooth operation, not only when the cutting is along the side edge of the guide bar, but also when the cutting is partially or wholly at the nose of the guide bar as during a boring operation. At the nose of the guide bar, each projection 20 cooperates with its depth gauge 16 to provide for two-point contact along line 27 with the bottom of the arcuate kerf, and that aids in firmly supporting and guiding the forward end of the cutter link. That two-point support is positioned radially outwardly from the center of the pivot pin at the forward end of the cutter link so that a guiding support is provided for the adjacent portion of the chain. Hence, as the nose of the guide bar is pushed against the work piece, the advance is only at the rate to provide uniform and smooth cutting by each of the cutter links, and the chips are carried away without interfering with the cutting operation or the movement of the chain.

Projections 20 on the cutter links also provide an improved balanced action in the movement of the links along the sides of the guide bar. That result has been evidenced by the uniform wear at the bottom link-supporting edges 40 and 42 on each of the cutter links. It has been recognized in the past that the supporting edge on the trailing end of a standard cutter link wears faster than the supporting edge on the leading end. That excessive wear at the trailing end of the link results from the cutting force at the cutting edge which tends to lift the forward end of the cutter link away from the guide bar surface, with that force acting with a lever arm from the cutting edge of the axis of the pivot pin at the trailing end of the link. With progressive wear at the rear of the link the cutter link gradually tips toward a position where its longitudinal axis is no longer parallel with the supporting edge on the guide bar and consequently is no longer parallel to the direction of movement of the link. Hence, the depth gauge tends to guide the cutting edge to produce a shallower cut and the cutting edge is no longer at the optimum angle with respect to the bottom of the kerf. It is thus seen that this excessive wear at the rear of the cutter links can become a limiting factor in the useful life of the saw chain; i.e., the operation is materially impaired and the chain must be rebuilt by the replacement of the cutter links or completely discarded.

With the cutter links of the present invention, each deflector 20 prevents the forward end of the cutter link from rising away from the guide bar, apparently because forces are exerted by the chips which counteract the forces acting on the cutting edge. Also, it appears that the deflector prevents the chips from exerting "holding" forces on the leading edge of its depth gauge. Such forces tend to act in concert with the forces on the cutting edge tending to lift the leading end of the cutter link. Forces produced by chips pressing on a deflector 20 act in the opposite direction through a lever arm which is greater than that through which the cutting forces act. It also appears that the excessive wear on the rear of the standard cutter links may result partially from erratic cutting actions. In contrast, the chain of the present invention produces a smooth cutting action so that each cutter link cuts at the optimum depth and one cutter link is not required to cut an excessive depth because the next leading cutter link has produced a shallow cut.

It has been indicated above that the angle between the tangent line 27 and the plane of the pivot of the axes of cutter link of the illustrative embodiment is of the order of 30°. This angle should be smaller than 45° and preferably is 30°, but it can be less. In this embodiment this angle is substantially the same as that between the longitudinal axes of adjacent side links when the chain travels around the arcuate nose portion so that line 27 is substantially parallel with the longitudinal axis of the next leading side link. It is understood that this relationship may be departed from while still retaining important advantages of the invention.

I claim:

1. A saw chain comprising, center links and side links and interconnecting pivot means, each of said side links having two end portions and an interconnecting portion integral therewith, said end portions being in alignment and presenting aligned supporting surfaces which are adapted to rest upon and be supported by the longitudinal surfaces of a guide bar, certain of said side links being cutter links each of which has a cutter tooth with a cutting edge and a depth gauge which moves in advance of its cutting edge and is substantially in alignment with end portion of its link and with the adjacent end portion of the next side link, each of said cutter links having a projection integral with its depth gauge and in substantial alignment therewith and having an extreme end which is positioned along the edge of said adjacent end portion of the next side link which is opposite to said supporting surface thereof.

2. A saw chain as described in claim 1 wherein said projection has a top edge which extends continuously from the adjacent edge of its depth gauge substantially to said adjacent end portion of the next side link when moving along a straight edge.

3. A saw chain as described in claim 1 wherein said projection has a forward end substantially in transverse alignment with the next adjacent pivot axis.

4. A saw chain as described in claim 1 wherein said projection has a rounded forward end with a concave edge extending along said adjacent end portion of the next side link and a convex edge remote therefrom.

5. A saw chain as described in claim 1 wherein said projection has a forward end adjacent the next side link and an edge surface extending therefrom which is convex and terminates in a straight portion adjacent said depth gauge.

6. A saw chain as described in claim 5 wherein a line tangent to said depth gauge and said convex edge is substantially parallel with the line of the axes of said next side link when said cutter link and said next side link are moving along an arcuate path around the nose of the guide bar of a chain saw.

7. In a saw chain of the type having a central row of drive links and two rows of side links positioned along the sides of said row of center links and in pairs with the side links of each pair being aligned transversely of the rows, and wherein each center link is connected adjacent its respective ends with the ends of two side links by a transverse pivot, and wherein certain of said side links are cutter links each of which has a cutting edge and a depth gauge which is positioned in leading relationship with respect to its cutting edge, that improvement which comprises cutter links each of which has a deflector positioned in leading relationship with respect to its depth gauge and overhanging the space between said depth gauge and the adjacent side link pivot, said deflector presenting an edge surface extending continuously from the edge surface of said depth gauge generally toward the central portion of the next leading side link when moving along a straight edge.

8. The improvement described in claim 7 wherein said deflector has an arcuate edge adjacent said leading side link with its axis substantially coincident with the adjacent pivot axis of said leading side link and wherein said deflector has a leading end surface adjacent said arcuate edge and a trailing curved surface extending from said leading end surface.

9. The improvement as described in claim 7 wherein said deflector and its depth gauge present point contacts with a line tangent thereto which is less than 45° and not substantially less than 30° from the longitudinal axis of the cutter link.

10. The improvement as described in claim 7 wherein said edge surface of said deflector extends from a point in transverse alignment with the edge of the next adjacent center link in trailing relationship to said edge surface of said depth gauge with a line tangent to said edge surfaces being at an angle of the order of 25° to 45° from the longitudinal axis of the cutter link.

11. In a chain saw, the combination of, a saw chain, and a guide bar upon which said saw chain is mounted and presenting an edge groove along longitudinal side edges and a nose end along which said saw chain is moved, said saw chain comprising, center links with tangs positioned in said groove, side links and interconnecting pivot means, each of said side links having two end portions and an interconnecting portion integral therewith, said end portions being in alignment and presenting aligned supporting surfaces which are adapted to rest upon and be supported by longitudinal surfaces of said guide bar at the sides of said groove, certain of said side links being cutter links each of which has a cutter tooth with a cutting edge overhanging said groove and a depth gauge which moves in advance of its cutting edge and is substantially in alignment with the end portion of its link and with the adjacent end portion of the next side link, each of said cutter links having a projection integral with its depth gauge and in substantial alignment therewith and having an extreme end which is positioned at the edge of said adjacent end portion of the next side link which presents a deflecting edge extending in trailing relationship with respect to the direction of movement of the link at an angle which is not greater than 45° away from said supporting surface thereof.